(12) United States Patent
Shankar

(10) Patent No.: US 9,569,482 B2
(45) Date of Patent: Feb. 14, 2017

(54) TRANSFORMING DEFAULT VALUES DYNAMICALLY

(75) Inventor: Shrikanth Shankar, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 11/801,495

(22) Filed: May 9, 2007

(65) Prior Publication Data

US 2008/0281845 A1    Nov. 13, 2008

(51) Int. Cl.
G06F 7/00     (2006.01)
G06F 17/30    (2006.01)
G06F 17/00    (2006.01)

(52) U.S. Cl.
CPC ... G06F 17/30377 (2013.01); G06F 17/30306 (2013.01)

(58) Field of Classification Search
CPC .............. G06F 17/30377; G06F 17/30306
USPC .......... 707/3, 6, 100, 4, 2, 8, 104.1, 102, 1; 705/35
See application file for complete search history.

(56) References Cited

U.S. PATENT DOCUMENTS

| | | | |
|---|---|---|---|
| 5,227,967 A * | 7/1993 | Bailey .............................. | 705/35 |
| 5,315,709 A * | 5/1994 | Alston et al. ..................... | 707/6 |
| 5,440,743 A | 8/1995 | Yokota et al. | |
| 5,448,727 A | 9/1995 | Annevelink | |
| 5,555,388 A | 9/1996 | Shaughnessy | |
| 5,608,903 A | 3/1997 | Prasad et al. | |
| 5,640,550 A * | 6/1997 | Coker .............................. | 707/4 |
| 5,706,494 A * | 1/1998 | Cochrane et al. | |
| 5,717,924 A | 2/1998 | Kawai | |
| 5,842,196 A * | 11/1998 | Agarwal ........... | G06F 17/30327 |
| 5,978,426 A | 11/1999 | Glover et al. | |
| 6,016,497 A | 1/2000 | Suver | |
| 6,122,630 A | 9/2000 | Strickler et al. | |
| 6,122,640 A | 9/2000 | Pereira | |
| 6,173,313 B1 | 1/2001 | Klots et al. | |
| 6,268,850 B1 | 7/2001 | Ng | |
| 6,304,867 B1 | 10/2001 | Schmidt | |
| 6,324,535 B1 | 11/2001 | Bair et al. | |
| 6,363,387 B1 | 3/2002 | Ponnekanti et al. | |
| 6,460,055 B1 | 10/2002 | Midgley et al. | |
| 6,480,848 B1 * | 11/2002 | DeKimpe et al. ................ | 707/8 |
| 6,519,613 B1 | 2/2003 | Friske et al. | |
| 6,542,895 B1 * | 4/2003 | DeKimpe et al. | |

(Continued)

OTHER PUBLICATIONS

Ambler, Scott, and Pramod Sadalage. Refactoring Databases: Evolutionary Database Design. Mar. 3, 2006, 7 pages.*

(Continued)

*Primary Examiner* — Kannan Shanmugasundaram
(74) *Attorney, Agent, or Firm* — Hickman Palermo Becker Bingham LLP; Marcel K. Bingham

(57) ABSTRACT

When altering records in a repository of information to add an attribute that has a non-NULL default value and a corresponding constraint to the records, no update record is issued and instead, the existing records are essentially treated as having a NULL value for the attribute being added. To compute a query over the records to which the attribute has been added, a value is generated for rows that hold NULL values for the attribute in which the value in which the NULL values held therein are translated to the default value.

10 Claims, 2 Drawing Sheets

(56) References Cited

U.S. PATENT DOCUMENTS

| | | | |
|---|---|---|---|
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1* | 7/2004 | Schoening et al. ........... 719/316 |
| 6,801,983 | B2 | 10/2004 | Abe et al. |
| 6,834,290 | B1 | 12/2004 | Pugh et al. |
| 7,269,595 | B1* | 9/2007 | Loboz ............... G06F 17/30339 707/803 |
| 7,574,461 | B1 | 8/2009 | Armorer et al. |
| 7,693,889 | B1 | 4/2010 | Armorer et al. |
| 2002/0019972 | A1 | 2/2002 | Grier et al. |
| 2002/0087271 | A1 | 7/2002 | Rozenshtein et al. |
| 2002/0133510 | A1 | 9/2002 | Lau |
| 2002/0188600 | A1* | 12/2002 | Lindsay et al. ................... 707/3 |
| 2003/0154216 | A1 | 8/2003 | Arnold et al. |
| 2003/0217069 | A1* | 11/2003 | Fagin et al. ................. 707/102 |
| 2003/0229610 | A1* | 12/2003 | Van Treeck ...................... 707/1 |
| 2004/0064487 | A1 | 4/2004 | Nguyen et al. |
| 2005/0102303 | A1 | 5/2005 | Russell et al. |
| 2005/0149475 | A1 | 7/2005 | Chkodrov et al. |
| 2005/0154695 | A1 | 7/2005 | Gonzalez et al. |
| 2006/0015528 | A1* | 1/2006 | Hejlsberg et al. ......... 707/104.1 |
| 2006/0085457 | A1* | 4/2006 | Gelfand ....................... 707/100 |
| 2006/0085465 | A1* | 4/2006 | Nori et al. .................... 707/101 |
| 2006/0161806 | A1* | 7/2006 | Gromyko .......................... 714/6 |
| 2007/0038590 | A1 | 2/2007 | Vijayan et al. |
| 2007/0038651 | A1* | 2/2007 | Bernstein et al. ............ 707/100 |
| 2007/0079140 | A1 | 4/2007 | Metzger et al. |
| 2007/0219951 | A1* | 9/2007 | Ahmed et al. .................... 707/2 |
| 2007/0282515 | A1* | 12/2007 | Arora ............................ 701/101 |
| 2009/0089334 | A1* | 4/2009 | Mohamed ......... G06F 17/30339 |

OTHER PUBLICATIONS

Davidson, Tom. "Managing Schema Changes (Part 2)." MSSQL Server Development Customer Advisory Team. Mar. 31, 2006. Microsoft Corporation. Nov. 19, 2000 http://blogs.msdn .com/sqlcat/archive/2006/03/31/566046.aspx, 11 pages.*

Paapanen, Eric, et al., "Oracle Database Application Developer's Guide—Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

U.S. Appl. No. 09/968,703, filed Sep. 28, 2001.

U.S. Appl. No. 11/201,797, filed Aug. 10, 2005.

U.S. Appl. No. 11/444,571, filed May 31, 2006.

Date, C.J., et al., "A Guide to SQL/DS", Codd and Date Consulting Group, Addison-Wesley Publishing Company, Printed Feb. 1989, 13 pages.

Lassen, Allen R., "Experiences With Object Oriented Development in PL/SQL", Centre for Object Technology, Copyright 2000, COT/4-18-v1.4, 27 pages.

Oracle, "Object Cache Navigation", Copyright 1996, 2002 Oracle Corporation, Oracle Call Interface Programmer's Guide, Release 2 (9.2), Part No. A96584-01, 18 pages.

Quest, "Reorganization for the 24x7 Database", Quest Software, Inc., LiveReorg®, 2001, 4 pages.

Davidson, Tom. "Managing Schema Changes (Part 2)." MSSQL Server Development Customer Advisory Team. Mar. 31, 2006. Microsoft Corporation. Nov. 19, 2000 http://blogs.msdn.com/sglcat/archive/2006/03/31/566046.aspx, 11 pages.

U.S. Appl. No. 11/444,571, filed May 31, 2006, Notice of Allowance, Mar. 21, 2011.

U.S. Appl. No. 11/201,797, filed Aug. 10, 2005, Final Office Action, Dec. 7, 2010.

U.S. Appl. No. 11/875,478, filed Oct. 19, 2007, Office Action, Jan. 31, 2012.

U.S. Appl. No. 11/201,797, filed Aug. 10, 2005, Final Office Action, Jan. 25, 2012.

U.S. Appl. No. 11/875,478, filed Oct. 19, 2007, Advisory Action, Mar. 8, 2013.

U.S. Appl. No. 11/875,478, filed Oct. 19, 2007, Final Office Acttion, Jan. 29, 2013.

U.S. Appl. No. 11/875,478, filed Oct. 19, 2007, Interview Summary, Feb. 26, 2013.

U.S. Appl. No. 11/875,478, filed Oct. 19, 2007, Office Action, Jun. 27, 2012.

U.S. Appl. No. 11/875,478, filed Oct. 19, 2007, Notice of Allowance, Jun. 12, 2013.

* cited by examiner

TRANSFORMING DEFAULT VALUES DYNAMICALLY

TECHNOLOGY

The present invention relates generally to computing. More specifically, embodiments of the present invention relate to transforming default values dynamically.

BACKGROUND

Information is conveniently stored in repositories such as databases. Stored information is accessed and updated with applications executing in a database management system (DBMS). A DBMS functions to store and access information in a database in one or more data containers, each of which contains records. The data within each record is organized into one or more attribute fields. Various database architectures exist.

The data containers of relational databases are tables and the records stored therein are rows. The database can contain virtually any number of tables, the attributes of which, are referred to as columns. The data containers of an object oriented database are object classes, the records of which comprise objects, which have attributes referred to as object attributes. Other database architectures also exist. For simplicity and unity herein, a relational database is discussed, solely by way of example.

Applications are upgraded from time to time. For instance, an installed application may be upgraded when a new version of the application code becomes available. With database and related applications, upgrading to a new version frequently requires that a column be added to an existing table, e.g., stored in a relational database.

Upon adding a new column, one of two conditions are is typically satisfied. Either all existing rows in the table store a null value for the column being added, or all existing rows store a default value for that column.

In the latter case, the default value is set at the time the column is added. The operation of adding a column with a default value may expend a lot time during which the database server or the table may not be available. This can cause significant inconvenience and expense.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Based on the foregoing, it could be useful to reduce the downtime and concomitant inconvenience and expense in updating applications.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Transforming default values dynamically is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to transforming default values dynamically. When altering records in a repository of information to add an attribute that has a non-NULL default value and a corresponding constraint to the records, no update operation is performed to add the default value. Instead, the existing records are essentially treated as having a NULL value for the attribute being added. To compute a query over the records to which the attribute has been added, a value is generated for rows that hold NULL values for the attribute in which the value in which the NULL values held therein are translated to the default value.

The example embodiments described herein alter the records stored in the repository to add the attribute. Moreover, the example embodiments achieve the foregoing with minimal downtime and more convenience.

Example Procedures

Procedures that may be implemented with an embodiment may be performed with more or less steps than the example steps shown and/or with steps executing in an order that may differ from that of the example procedures. The example procedures may execute on one or more computer systems under the control of machine readable instructions encoded in one or more computer readable storage media.

The example procedures described herein may be performed in relation to making alterations to an information storage repository such as a database. Example embodiments may be implemented with a database management system (DBMS). Embodiments of the present invention are not limited to any particular database architecture. The repository may store a body of records in one or more data containers. A data container may conform to tables in a relational database, a collection of objects (i.e. instances of object classes) in an object oriented database, or the like. The records within the body of records may conform to rows in a table, objects of an object class, or the like. The attributes of the records may conform to columns of the rows of a table, object attributes, or the like. For clarity, simplicity and brevity, the example procedures with be described with reference to a relational database. It is to be appreciated however that embodiments are well suited to execution in any kind of database or other information repository architecture.

Figure 1:
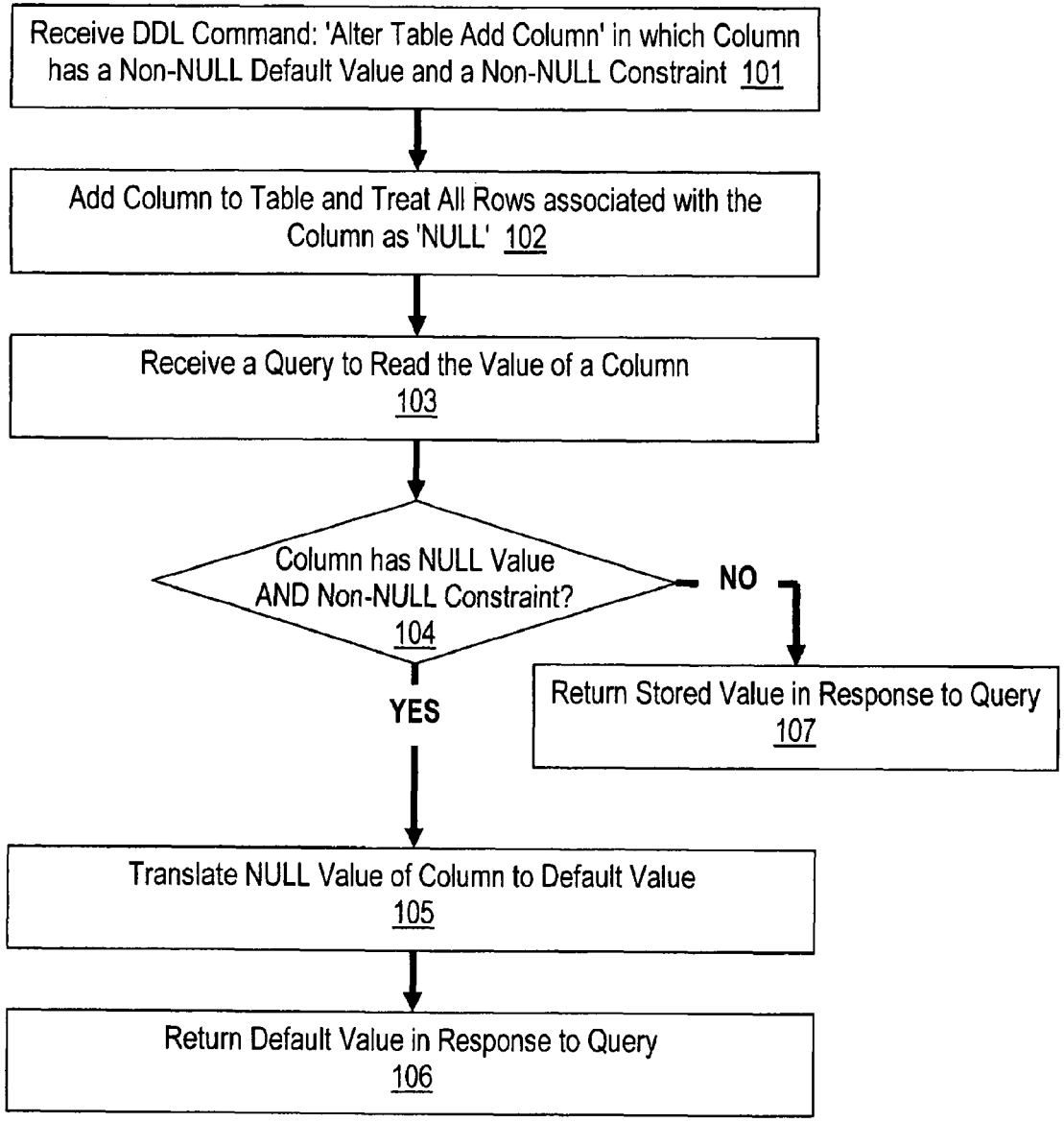
FIG. 1 depicts an example procedure, according to an embodiment of the invention.

FIG. 1 depicts an example procedure 100, according to an embodiment of the invention. In block 101, an instruction such as a data definition language (DDL) command is received. The instruction is issued to alter a table by adding a column. The instruction specifies that the column has a default value other than NULL. Further, the instruction specifies a Non-NULL constraint for the column. When a column has a Non-null constraint, the database system does not insert a new row unless a Non-NULL value is specified for it, and/or does not allow the column to be updated to NULL. According to an embodiment, when a database system receives such a DDL statement, it generates database metadata that defines the column, the NON-null constraint, and/or the default value.

In block 102, the column is added to the table and all rows associated with the column are treated as holding a NULL value. The NULL values of the rows associated with the added column may not be physically stored on disk and no update statement is generated. In an embodiment, upon receiving the instruction, the column is created for the rows and a NULL value is, in effect, stored in at least a portion of the rows. In an embodiment, the NULL values are held in a column of the rows and metadata defines the Non-NULL default value for the column and the corresponding Non-NULL constraint.

In block 103, a query is received to read the value of a column. In block 104, it is determined whether the column to be read holds a NULL value and also has associated therewith a Non-NULL constraint. If not, then in response to the query, the value stored is returned in block 107.

However, if the column holds a NULL value and has a Non-NULL constraint, then in block 105, the NULL value held for the column is dynamically translated to the default value. In block 106, the default value is returned seamlessly in response to the query. When the tables are scanned during computation of the query, NULL values in the column of any rows read into memory are converted to the default value.

In an embodiment, computing the query may include, in effect, rewriting a query the query to replace reference to column with a function whose input is the column. If the column value is Non-Null, the function returns the Non-Null value. If the column value is NULL, the default value is returned.

Example Computer System Platform

Figure 2:
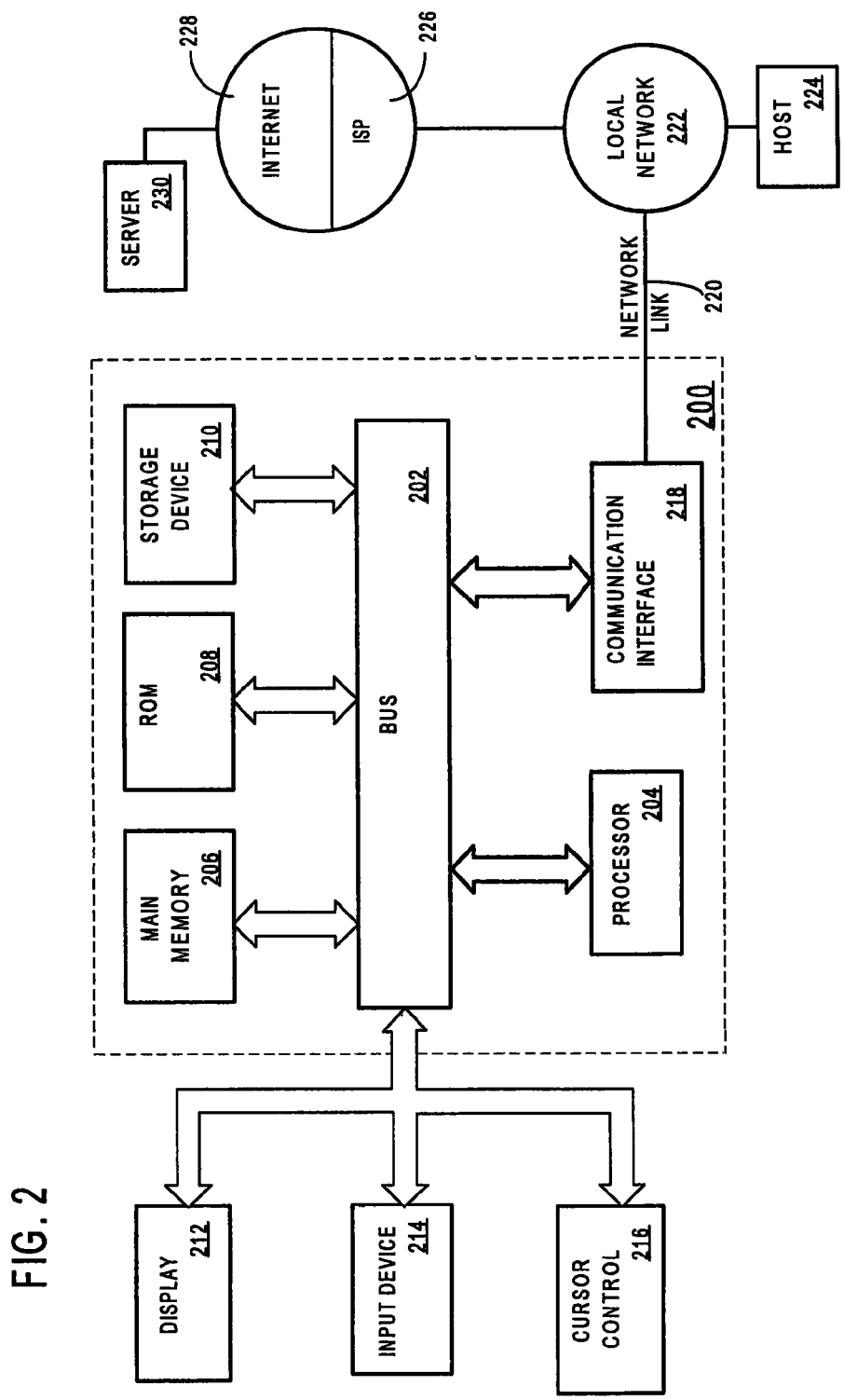
FIG. 2 depicts an example computer system platform, with which an embodiment of the present invention may be practiced.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a liquid crystal display (LCD), cathode ray tube (CRT) or the like, for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for indicating function invocation with a stored value. According to one embodiment of the invention, indicating function invocation with a stored value is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and other conductors and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a digital subscriber line (DSL), cable or other modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for indicating function invocation with a stored value as described herein.

The received code may be executed by processor 204 as it is received, and/or stored in storage device 210, or other non-volatile storage for later execution. In this manner, computer system 200 may obtain application code in the form of a carrier wave.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method, comprising:
receiving an instruction that relates to defining an attribute within a body of records of a database wherein the instruction specifies a constraint on an attribute that restricts values in said attribute to non-NULL values and a non-NULL default value for said attribute;
in response to receiving said instruction, adding said attribute to said body of records;
wherein upon completing processing of said instruction:
said attribute holds NULL values for said body of records, and
metadata of said database defines:
said constraint on said attribute restricting said values in said attribute to said non-NULL values, and
said non-NULL default value for said attribute;
receiving a query to read said attribute;
in response to receiving said query, computing said query, wherein computing said query includes:
making a determination that
(a) said metadata defines said constraint on said attribute restricting said values in said attribute to said non-NULL values,
(b) said metadata defines said non-NULL default value for said attribute, and
(c) two or more records of said body of records hold a NULL value for said attribute;
returning, as a value for said two or more records, said non-NULL default value defined by said metadata instead of said NULL value;
wherein the method is performed by one or more computing devices.

2. The method as recited in claim 1 wherein returning said value for said two or more records comprises dynamically translating the NULL value held in the attribute of the two or more records of said body of records to the non-NULL default value upon computing the query.

3. The method as recited in claim 2 wherein computing the query further comprises:
re-writing the query to replace a reference therein to the attribute with a function wherein a input of the function is the attribute;
wherein the function returns the non-NULL default value when the attribute holds the NULL value.

4. The method as recited in claim 2 wherein the dynamically translating the NULL values further comprises:
transforming each record of the body of records associated with the attribute in memory; and
storing the non-NULL default value for each record of the body of records associated with the attribute in memory upon processing the query.

5. The method as recited in claim 1 wherein the instruction comprises a data definition language (DDL) command.

6. A non-transitory computer readable storage medium storing instructions encoded therewith which, when executed with one or more processors of a computer system, cause to perform:
receiving an instruction that relates to defining an attribute within a body of records of a database wherein the instruction specifies a constraint on an attribute that restricts values in said attribute to non-NULL values and a non-NULL default value for said attribute;
in response to receiving said instruction, adding said attribute to said body of records;
wherein upon completing processing of said instruction:
said attribute holds NULL values for said body of records, and
metadata of said database defines:
said constraint on said attribute restricting said values in said attribute to said non-NULL values, and
said non-NULL default value for said attribute;
receiving a query to read said attribute;
in response to receiving said query, computing said query, wherein computing said query includes:
making a determination that
(a) said metadata defines said constraint on said attribute restricting said values in said attribute to said non-NULL values,
(b) said metadata defines said non-NULL default value for said attribute, and
(c) two or more records of said body of records hold a NULL value for said attribute;

returning, as a value for said two or more records, said non-NULL default value defined by said metadata instead of said NULL value;

wherein the method is performed by one or more computing devices.

7. The non-transitory computer readable storage medium of claim 6, wherein returning said value for said two or more records comprises dynamically translating the NULL value held in the attribute of the two or more records of said body of records to the non-NULL default value upon computing the query.

8. The non-transitory computer readable storage medium of claim 7, wherein computing the query further comprises:
   re-writing the query to replace a reference therein to the attribute with a function wherein a input of the function is the attribute;
   wherein the function returns the non-NULL default when the attribute holds the NULL value.

9. The non-transitory computer readable storage medium of claim 7, wherein the dynamically translating the NULL values further comprises:
   transforming each record of the body of records associated with the attribute in memory; and
   storing the non-NULL default value for each record of the body of records associated with the attribute in memory upon processing the query.

10. The non-transitory computer readable storage medium of claim 6, wherein the instruction comprises a data definition language (DDL) command.

\* \* \* \* \*

UNITED STATES PATENT AND TRADEMARK OFFICE
CERTIFICATE OF CORRECTION

| | | |
|---|---|---|
| PATENT NO. | : 9,569,482 B2 | |
| APPLICATION NO. | : 11/801495 | |
| DATED | : February 14, 2017 | |
| INVENTOR(S) | : Shankar | |

It is certified that error appears in the above-identified patent and that said Letters Patent is hereby corrected as shown below:

On the Title Page

On page 2, Column 2, under Other Publications, Line 36, delete "Acttion," and insert -- Action, --, therefor.

In the Specification

In Column 1, Line 33, delete "are is" and insert -- are --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*